May 5, 1970     J. J. CERVENKA ET AL     3,510,823

FASTENER OR TERMINAL LUG DEVICE AND METHOD OF MAKING SAME

Filed April 29, 1968     4 Sheets-Sheet 1

INVENTORS
JOSEPH J. CERVENKA
MARVIN E. HETZEL

BY

ATTORNEYS

INVENTORS
JOSEPH J. CERVENKA
MARVIN E. HETZEL
BY
ATTORNEYS

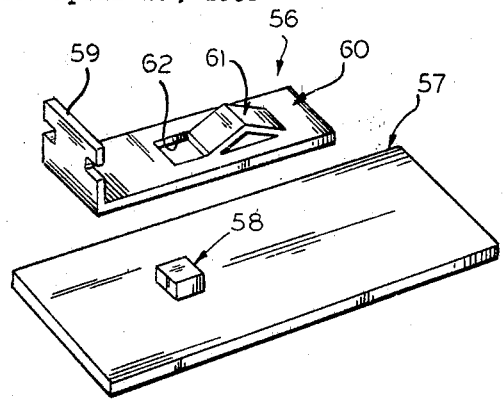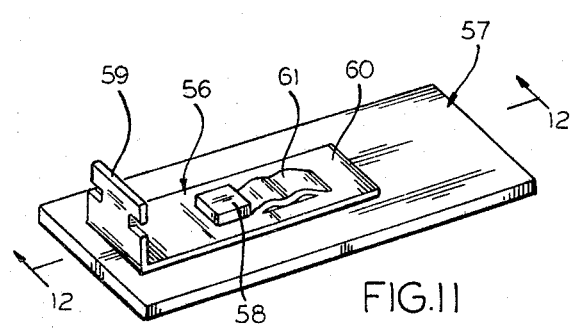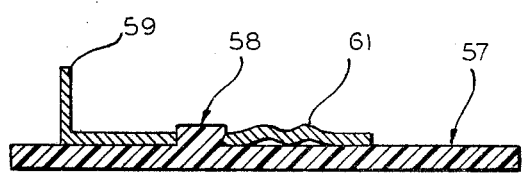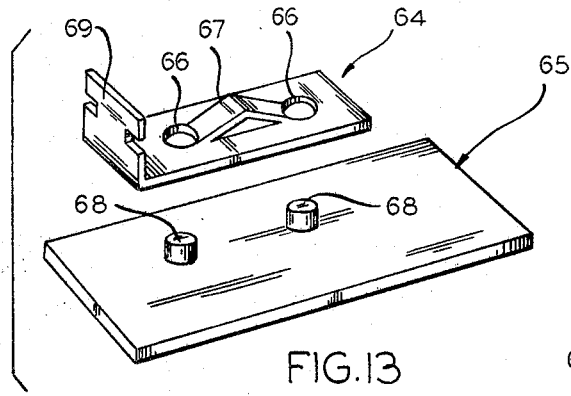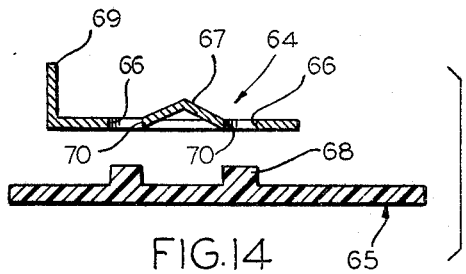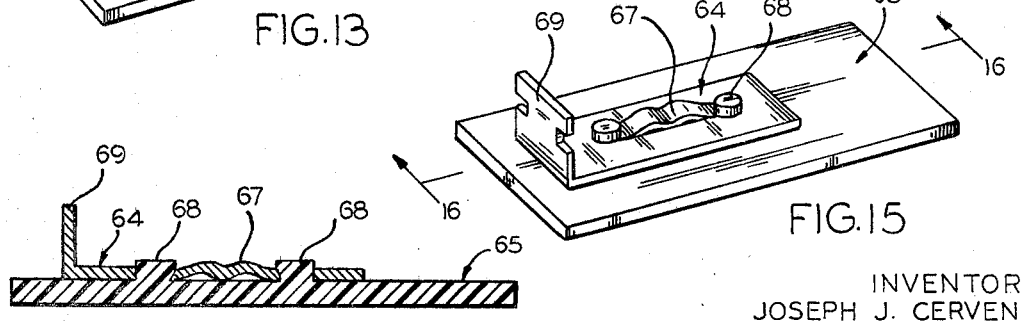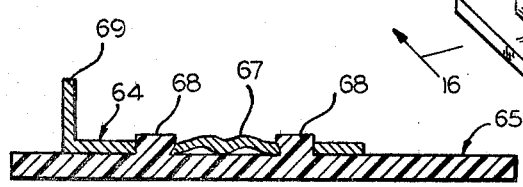

May 5, 1970     J. J. CERVENKA ET AL     3,510,823
FASTENER OR TERMINAL LUG DEVICE AND METHOD OF MAKING SAME
Filed April 29, 1968     4 Sheets-Sheet 4
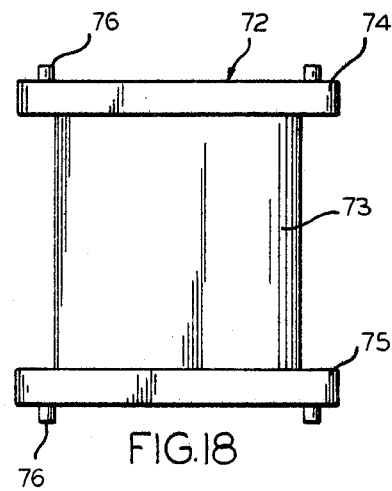
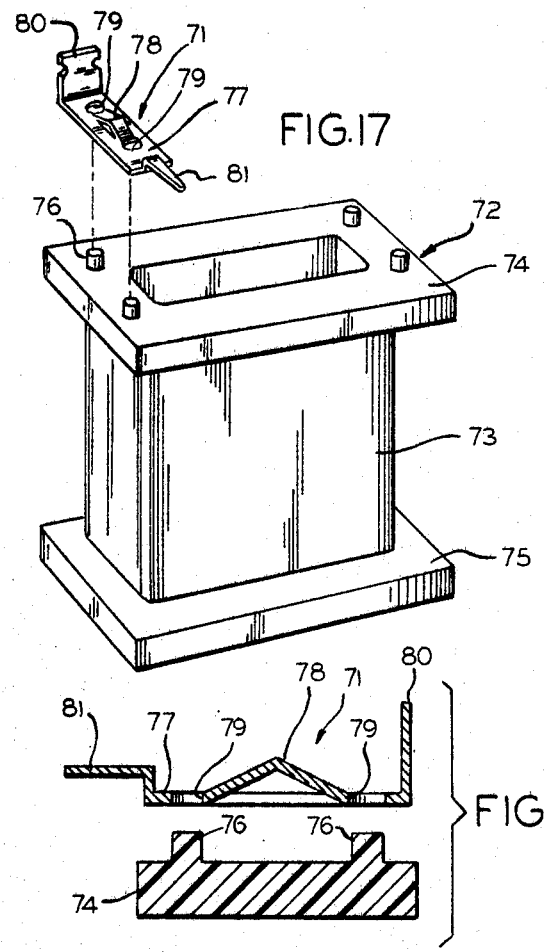
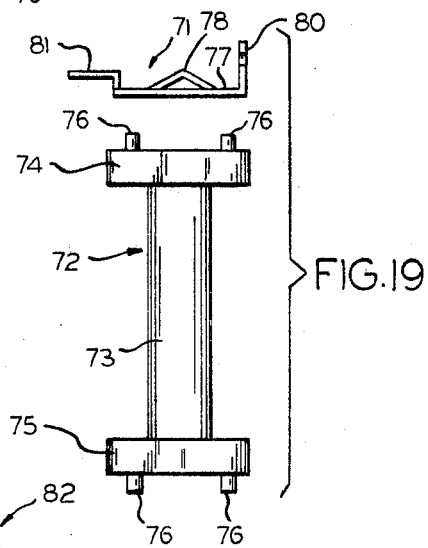
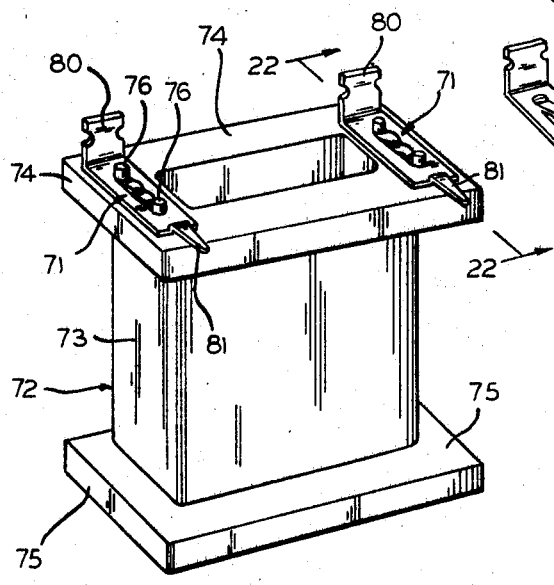
INVENTORS
JOSEPH J. CERVENKA
MARVIN E. HETZEL
BY
*Kinzer, Dorn and Zickert*
ATTORNEYS United States Patent Office 3,510,823
Patented May 5, 1970

3,510,823
FASTENER OR TERMINAL LUG DEVICE AND
METHOD OF MAKING SAME
Joseph J. Cervenka, 428 E. Crescent, Elmhurst, Ill.
60126, and Marvin E. Hetzel, 177 Michaux Road,
Riverside, Ill. 60546
Filed Apr. 29, 1968, Ser. No. 725,068
Int. Cl. H01r 9/20; H05k 1/10; F16b 37/02
U.S. Cl. 339—17                               18 Claims

ABSTRACT OF THE DISCLOSURE

A fastener or terminal lug device for application to plastic bodies having one or more upstanding posts wherein the device includes a flat body with a raised portion and one or more holes adjacent the raised portion, whereby collapse of the raised portion reduces the hole size.

---

This invention relates in general to a fastener or terminal lug device adapted to be applied to a plastic body having at least one post upstanding therefrom, and more particularly to a fastener or terminal lug device that may be quickly and easily secured to a plastic body, and still more particularly to a method of making a fastener or terminal lug device for application to plastic bodies.

The fastener or terminal lug device of the present invention is useful as a terminal lug that may be applied to a relay or solenoid bobbin made of plastic, which terminal lugs having tines are useful for attaching of conductive wires thereto. Heretofore, mounting of terminal lugs on plastic bobbins has involved the use of a terminal lug with a serrated tang that would be received in an opening or socket formed in the plastic bobbin. Such a terminal lug and mounting arrangement has been objectionable, since the lugs would not have sufficient pull strength and would therefore malfunction at critical times by not maintaining a secure position.

The terminal lug, according to the present invention, overcomes the difficulties heretofore encountered in providing a flat piece or sheet having a drawn or struck portion with one or more holes pierced through the sheet adjacent the drawn portion. The bobbin would be formed with a flat surface and one or more integral upstanding posts to receive the terminal lug. Collapsing of the drawn portion that is in raised relation to the flat portion of the lug decreases the size of any pierced hole to lock the lug onto the post and bobbin. While only a single post and hole need be provided in the combined fastening arrangement, more positive securement is obtained by use of a pair of posts and holes. Any number of posts and holes may be employed. It can be appreciated that a pair of posts mating with a pair of holes on a terminal lug will enable orientation of the lug and prevent relative rotation between a lug and the bobbin. It should also be appreciated that the terminal lug would be formed of a deformable metal such as brass and copper which may be easily formed and yet have a high electrical conductivity.

The present invention when employed as a fastener device may serve to lock two mating parts together such as when forming a tape reel by connecting together a pair of mating plastic molded parts. Further, the fastener device might merely attach a plate or other element to a plastic body. As such a fastener device, it need only be provided with a flat portion having a drawn raised portion with one or more holes pierced therethrough adjacent the drawn portion. Again, collapse of the drawn portion would decrease the size of any adjacent hole to secure the fastener device onto a post that would mate with the hole. The post and mating hole may have any suitable geometrical cross section, but preferably be mating where the hole would snugly fit on to the post. The post may be round, oval or polygonal, and be associated with a similarly shaped hole in a fastener device. The pressure needed for collapsing the raised portion of the fastener device is such that it will not in any way rupture or break the plastic body.

Another useful purpose of the present invention would involve the terminal lug device and application of same to a printed circuit board. Heretofore, the application of terminal lugs to printed circuit boards has involved first piercing holes in the board and then inserting a lug with a drawn rivet into the hole and crimping over to the underside. Such electrically exposes said lug to the underside of the board and necessitates taking suitable steps to insulate the lug from the underside such as by adding insulating material in the form of tape or otherwise. The terminal lug of the present invention may be provided to the upper side of a printed circuit board having posts upstanding therefrom, and where it can be appreciated that the lug would not at all be exposed to the underside of the board. The attachment of a terminal lug device according to the present invention to a printed circuit board may be easily accomplished by merely collapsing of the raised portion of the lug.

Accordingly, it is an object of the present invention to provide a new and improved fastener or terminal lug device for application to plastic bodies.

Another object of the present invention is in the provision of a method of making a new and improved fastener or terminal lug device that may be applied to plastic bodies.

Other objects, features and advantages of the invention will be apparent from the following detailed disclosure, taken in conjunction with the accompanying sheets of drawing, wherein like reference numerals refer to like parts, in which:

FIG. 9 is a perspective view of the still further embodiment of the invention, and illustrating a terminal lug device especially suitable for mounting on printed circuit boards, and showing the device in spaced relation to a printed circuit board;

FIG. 10 is a vertical sectional view taken through the terminal lug device of FIG. 9 and the associated printed circuit board;

FIG. 11 is a perspective view of the printed circuit board of FIG. 9 and the terminal lug mounted thereon;

FIG. 12 is an enlarged vertical sectional view taken substantially along line 12—12 of FIG. 11;

FIG. 13 is a modified terminal lug device according to the invention illustrated in perspective with an associated printed circuit board;

FIG. 14 is a vertical sectional view taken through the terminal lug device and printed circuit board of FIG. 13;

FIG. 15 is an assembly view of the terminal lug device and printed circuit board shown in FIG. 13;

FIG. 16 is a vertical sectional view taken substantially along line 16—16 of FIG. 15;

FIG. 17 is a perspective view of a coil bobbin and a terminal lug device adapted to be mounted thereon;

FIG. 18 is a front elevational view of the coil bobbin shown in FIG. 17;

FIG. 19 is an end elevational vew of the coil bobbin of FIG. 17 and the terminal lug device applicable thereto;

FIG. 20 is an enlarged vertical sectional view taken through the terminal lug device and a portion of the bobbin shown in FIG. 17;

FIG. 21 is a perspective view of a coil bobbin like that shown in FIG. 17, and having secured thereto a pair of terminal lug devices as shown in FIG. 17;

FIG. 22 is an enlarged vertical sectional view taken substantially along line 22—22 of FIG. 21; and FIG. 23 is a fragmentary perspective view of a plurality of terminal lug devices in chain form.

Figure 1:
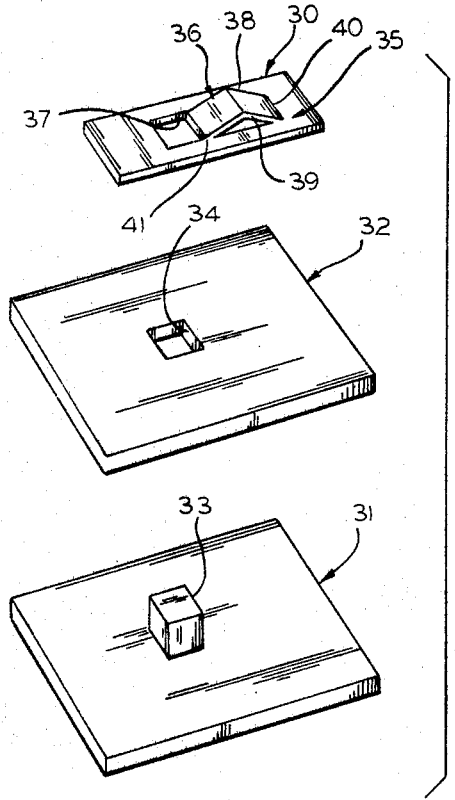
FIG. 1 is a perspective view of a fastener device according to the present invention, and shown with associated parts in exploded condition to illustrate its use.
Figure 2:
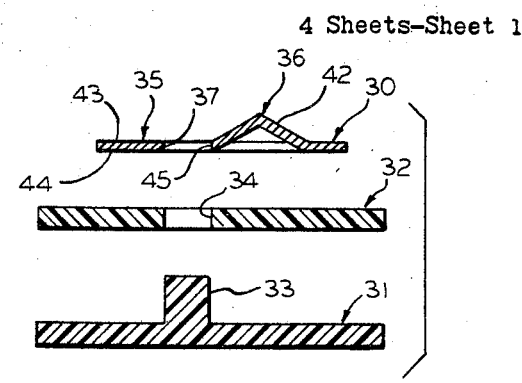
FIG. 2 is a vertical sectional view taken through the fastener device and associated parts shown in FIG. 1.
Figure 3:
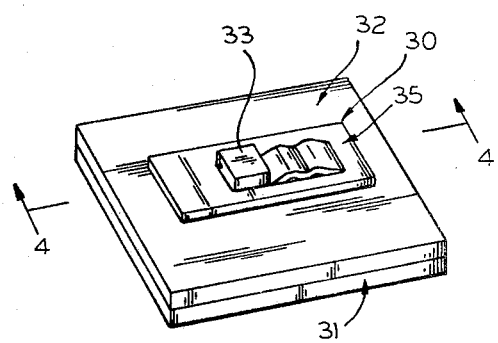
FIG. 3 is a perspective assembly view of the fastener device and associated parts shown in FIG. 1.

Referring now to the drawings, and particularly to FIGS. 1 to 4, a fastener device according to the invention, generally designated by the numeral 30, is shown for securing together plastic parts 31 and 32. Exemplary of the use of the fastener 30 in this embodiment would be a plastic tape or film reel having two parts mateable to form the completed product where the two parts are initially molded of plastic. For simplicity purposes, the parts 31 and 32 are merely shown as rectangularly shaped plastic bodies, wherein a post 33 is formed on the part 31 and a mating hole opening 34 is formed on the part 32. Thus, the post 33 is molded integrally with the part 31, while the opening 34 is formed during the molding of the part 32.

While the post 33 and hole 34 are shown to be rectangular in cross section, it should be appreciated that they may take any suitable geometrical shape. Further, it should be appreciated that the size of the opening 34 is such that it snugly fits on the post 33 to provide proper orientation therebetween.

The fastener device 30 is made of an easily deformable metal, such as brass or copper, and includes a flat portion 35, a raised portion 36, and a hole 37. The raised portion 36 is drawn or struck from the flat portion 35 during the making of the fastener, whereby the opposite edges 38 and 39 are separated from the flat portion 35 by a shearing operation. This leaves the opposite ends 40 and 41 attached to the flat portion. The drawing or striking operation defines the raised portion as having a total longitudinal dimension greater than the opening in the flat portion from which it is drawn. Following the drawing of the raised portion, the hole 37 is pierced in the flat portion 35, and of a size that will snugly fit onto the post 33 of the plastic body or part 31. The actual shape of the drawn or struck portion 36 may vary, but the upper surface 42 is preferably, essentially crown shaped to facilitate its collapse during application. However, the upper surface 42 may also be round or otherwise shaped as long as a raised portion is defined that extends upwardly from the upper surface 43 of the flat portion 35.

Figure 4:
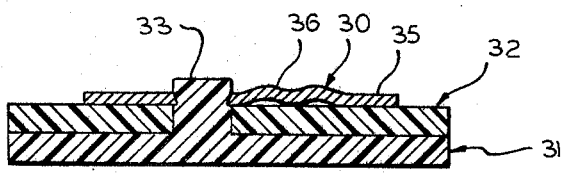
FIG. 4 is an enlarged vertical elevational sectional view taken substantially along line 4—4 of FIG. 3.
Figure 5:
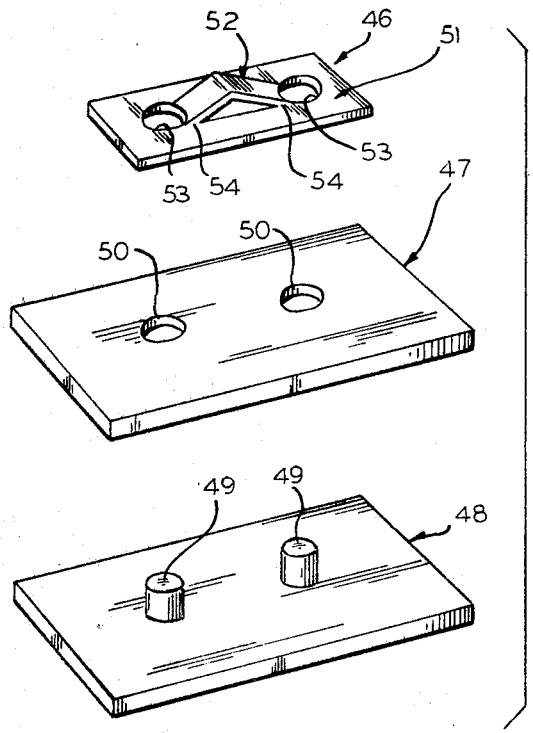
FIG. 5 is a perspective view of a modified fastener device according to the present invention, and illustrating same in an exploded view with associated parts.
Figure 6:
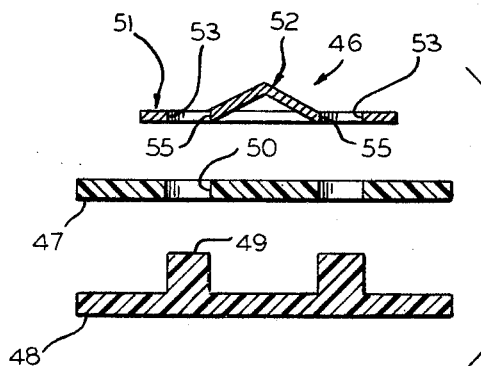
FIG. 6 is a vertical sectional view taken through the fastener and parts of FIG. 5.
Figure 7:
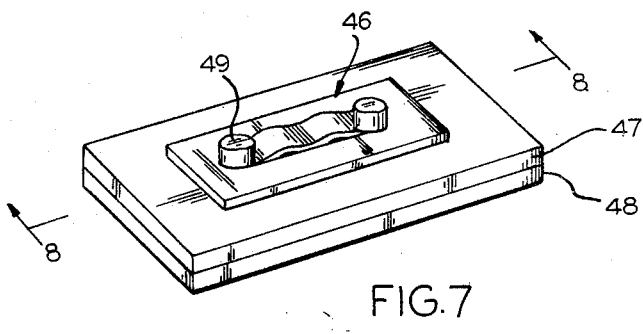
FIG. 7 is a perspective assembly view of the fastener and associated parts of FIG. 5.
Figure 8:
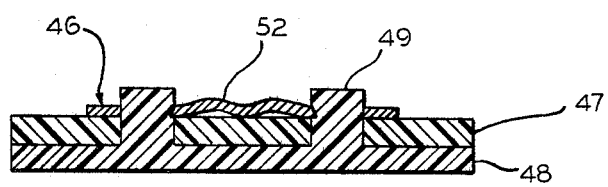
FIG. 8 is an enlarged vertical sectional view taken substantially along line 8—8 of FIG. 7.

Following assembly of the plastic parts 31 and 32 so that the plastic part 32 bottoms against the part 31 with the opening 34 in mating engagement with the past 33, the fastener device 30 may then be applied so that the lower surface 44 of the flat portion 35 bottoms or seats on the upper surface of the plastic part 32, with the opening 17 of the fastener device being snugly received on the post 33. Thereafter, collapse of the raised portion 36 by a suitable tool and in a manner illustrated in FIGS. 3 and 4, causes the free end 45 of the raised portion 36 to bite into one edge of the post 33, as seen in FIG. 4, and thereby securely fasten the fastener device to the post, and to also securely fasten the plastic part 32 to the plastic part 31. It is important that the opening or hole 37 be directly adjacent the drawn or raised portion 36 so that collapse of the raised portion decreases the size of the opening 37. This causes the effective clamping of the fastened device onto the post 33. By virtue of the rectangular cross section of the post 33, the opening 34 and the plastic part 32 and the opening 37 in the fastener device 30, relative rotation between the parts is prevented.

Another embodiment of the invention is shown in FIGS. 5 to 8, wherein a fastener device 46 is illustrated for use in fastening plastic part 47 to plastic part 48. Again for illustration purposes, the plastic parts 47 and 48 are merely shown as rectangular bodies. The plastic part 48 includes a pair of spaced posts 49 adapted to mate with a pair of spaced holes 50 in the plastic part 47.

The fastener 46 is in the form of a rectangular piece, and includes a flat portion 51 having a centrally positioned raised portion 52, and a pair of pierced holes 53 at opposite ends of the raised portion 52. This embodiment primarily differs from the embodiment of FIGS. 1 to 4 in that a pair of holes are provided in the fastener device. Again, the fastener device is made of a deformable metal and where the raised portion 52 is drawn or struck from a flat sheet of material. Thereafter, the holes 53 are pierced at the opposite ends of the raised portion 52 in such a manner that the opposite ends of the raised portion are still connected at 54 to the flat portion 51.

The posts 49 and the holes 53 of the fastener device 46 are round or circular in shape to illustrate another form, and it should be appreciated that the holes 53 are sized to snugly fit over the posts 49. While only a pair of posts are shown on the plastic part and only a single raised portion and coacting pair of holes is shown in the fastener device, it should be appreciated that any number of posts may be employed to coact with any number of holes on raised portions in the fastener device. For example, if the fastener device were desired to be much larger in area, it would likely be necessary to include another raised portion and openings to coact with other posts on the plastic part to which the fastener is to be applied.

Application and fastening of the fastener device 46 is the same as in the first embodiment, wherein following placement of the plastic part 47 on the plastic part 48, the fastener device is applied so that the openings 53 are telescopically received over the upper ends of the posts 49. Thereafter, collapsing of the raised portion 52 causes the opposite ends 55 to move away from each other and bite into the posts 49 as shown particularly in FIG. 8. Thus, the opposite ends of the raised portion 52 comprise a part of the peripheral edges of the holes 53 which are displaced during the slight straightening operation of the raised portion 52 to cause decrease in size of the holes and a gripping condition on the posts 49. Because the holes 53 are pierced in the flat portion 51 subsequent to the formation of the raised portion 52, the lower ends of the edges 55 are relatively sharp and will bite into the posts without fracturing the posts to thereby effectively connect the fastener device to the posts. This secures the plastic part 47 in place and in assembly with the plastic part 48.

The present invention is useful in the form of a terminal lug as shown in one embodiment in FIGS. 9 to 12, wherein the terminal lug device is generally designated by the numeral 56. Here the device is illustrated as being applicable to a printed circuit board 57 which would be constructed of a suitable plastic insulating material. The board 57 is merely illustrated in rectangular form, although it may take any suitable form. An upstanding post 58 is provided on the board 57 to coact with terminal lug device 66.

It is quite often desirable to mount a terminal lug on a printed circuit board for the purpose of connecting wires thereto in interconnecting the components on the board. It should also be appreciated that while the board 57 is referred to as a printed circuit board, it may not have any printed circuitry thereon, but merely serve as an insulating electronic component receiving board.

The terminal lug device 56 in the embodiment of FIGS. 9 to 12 is substantially the same as the fastener device 30 in the embodiment of FIGS. 1 to 4 with the exception that a terminal lug portion 59 is provided at one end of the flat portion 60. In other respects it is the same in that it includes a raised portion 61 adjacent to a pierced hole 62, wherein the edge 63 of the raised portion 61 constitutes one side of the rectangular hole 62. Application of the terminal lug device 56 to the board 57 whereby the hole 62 receives the post 58 is accomplished in the same manner as assembly of the fastener device in FIGS. 1 to 4. When the terminal lug face portion 60 is bottomed on the board 57, a suitable tool is employed to collapse the raised portion 61 and cause the edge 63 to bite into the post 58 as shown in FIG. 12. The terminal lug device is then securely fastened to the printed circuit board, and automatically inserted from the underside of the board.

Another form of terminal lug device is shown in FIGS. 13 to 16 wherein the device is generally designated by the numeral 64 for application to the printed circuit board 65. This device differs from the one shown in FIGS. 9 to 12 in that a pair of holes 66 are provided at opposite ends of a raised portion 67, wherein the holes mate with spaced posts 68 formed integrally on the board 65. This embodiment is similar to the fastener device 46 of FIGS. 5 to 8, and principally differs therefrom only in the addition of an upstanding terminal lug portion 69. The application of this terminal lug device to the printed circuit board is the same as application of the fastener device 46 to the plastic part 48, wherein upon collapse of the raised portion 67, the edges 70 thereof are driven apart and into biting relation with the post 68. It can be appreciated that somewhat better fastening is obtained by the device 64 where a pair of posts are involved when compared to the device 56 having only a single post.

Referring now to FIGS. 17 to 22, another terminal lug device embodiment of the invention is illustrated for application to coil bobbins that may be employed in relays, solenoids or otherwise. The terminal lug device is generally indicated by the numeral 71 and is shown in position for application to a bobbin 72 in FIG. 17. The bobbin 72 includes a central rectangularly shaped hollow body portion 73 and opposed wire containing flanges 74 and 75. Thus, wire may be wound about the central body 73 between the flanges 74 and 75. The outer surfaces of the flanges 74 and 75 are also provided with posts 76 adapted to coact with the terminal lug device 71 in mounting same on the bobbin. The bobbin 72 is molded of plastic, and the posts 76 are molded integral therewith.

The terminal lug device 71 includes a flat portion 77 having a raised portion 78 drawn therefrom, holes 79 pierced at opposite ends of the raised portions 78, an upstanding lug portion 80 at one end of the flat portion 77, and a tine 81 at the other end of the flat portion. Except for the offset tine 81, the terminal lug device 71 is identical to that shown in FIGS. 13 to 16. Again, the terminal lug device will be constructed of a deformable metal having high conductivity characteristics.

While the terminal lug device 71 is illustrated as having a pair of holes 79 that will coact with the posts 76 for mounting of the device on the bobbin, it should be appreciated that a single hole and post arrangement may be provided, or a number of holes and posts greater than two could be employed within the scope of the present invention. In the formation of the terminal lug device 71, the shape would first be sheared according to the desired pattern. Thereafter, the raised portion would be drawn which would be followed by the piercing of the holes at the end of the raised portion. The lug portion and tine may then be bent as shown. Alternatively, the lug portion and tine may be bent relative to the flat portion prior to the drawing of the raised portion and the piercing of the holes.

Like in the other embodiments, application of the terminal lug device will include first seating of the device against the flat surface of the flange 74, and thereafter collapsing of the raised portion to lock the device to the flange and bobbin. As shown in FIG. 21, a pair of terminal lug devices are mounted on the upper flange 74 of the bobbin, and it will be appreciated that additional terminal lug devices may be mounted on the bottom flange 75 if needed.

While the terminal lug devices 71 may be made as individual devices, and thereafter individually applied to the bobbin, they may also be formed continuously or in a chain, side by side, as shown in FIG. 23, and generally designated by the numeral 82. Connecting legs 83 are provided between adjacent terminal lug devices to hold them together in chain form until needed for application to a bobbin. At that time, the connecting legs may be sheared in any suitable manner.

It will be understood that modifications and variations may be effected without departing from the scope of the modern concepts of the present invention.

The invention is hereby claimed as follows:

1. In combination with a plastic body having a flat surface and a post upstanding therefrom, a fastener to secure to said post including a relatively thin sheet of deformable metal having a hole therethrough snugly mateable with but freely slidable on said post, and a raised portion struck or drawn from the sheet adjacent the hole and deformably anchored adjacent the hole in such a manner that collapse of the raised portion after positioning the fastener onto the post and against the flat surface of the plastic body causes the hole to be decreased in size and thereby secure the fastener to the plastic body.

2. A fastener as defined in claim 1, wherein said hole is round.

3. A fastener as defined in claim 1, wherein said hole is polygonal.

4. A fastener as defined in claim 1, wherein said raised portion is cut free at least along a part of the periphery.

5. In combination with a plastic body having a flat surface and a pair of spaced posts upstanding therefrom, a fastener to secure to said body including a relatively thin sheet of deformable metal having a pair of spaced holes therethrough freely but snugly mateable with said posts, and a raised portion struck or drawn from the sheet adjacent the holes and deformably anchored adjacent the holes in such a manner that collapse of the raised portion after positioning the fastener onto the posts and against the flat surface of the plastic body causes the holes to be decreased in size thereby effecitvely securing the fastener to the plastic body.

6. A fastener as defined in claim 5, wherein said raised portion is cut free at least along a part of the periphery.

7. In combination with a printed circuit board having a flat surface and an upstanding post, a lug to secure to said board comprising a flat body of deformable metal, a hole extending through said flat body and sized to be freely but snugly received on said post, a raised portion adjacent said hole struck from said flat body and deformably anchored adjacent the hole in such a manner that collapse of the raised portion after positioning the lug onto the post and against the flat surface of the board causes the hole to be decreased in size and thereby secure the lug to the post and board, and a lug portion upstanding from said flat body.

8. In combination with a plastic printed circuit board having a flat surface and post means upstanding therefrom, a lug to secure said board comprising a flat body of deformable metal, hole means extending through said flat body and sized to be freely but snugly received on said post means, and a raised portion struck or drawn from the flat body adjacent the hole means and deformably anchored adjacent the hole means in such a manner that collapse of the raised portion after positioning the lug onto said post means and against the flat surface of said board means causes the hole means to be decreased in size and thereby secure the lug to the board.

9. A lug a defined in claim 8, wherein said hole means includes a single hole.

10. A lug as defined in claim 8, wherein said hole means includes a plurality of holes.

11. A lug as defined in claim 8, wherein said hole means includes at least one round hole.

12. A lug as defined in claim 8, wherein said hole means includes at least one polygonal hole.

13. In combination with a plastic bobbin including a flat surface and post means upstanding therefrom, a terminal lug to secure to the bobbin comprising a relatively thin flat portion, a raised portion struck or drawn from the flat portion to define hole means adjacent the raised portion sized to freely but closely matingly receive the post means and deformably anchored adjacent the hole means in such a manner that collapse of the raised portion after positioning the terminal lug onto said flat surface with the hole means in registry with said post means causes the hole means to be decreased in size and thereby lock the terminal lug to the bobbin, and wire connecting lugs extending from the flat portion.

14. A terminal lug as defined in claim 13, wherein said hole means includes a single hole.

15. A terminal lug as defined in claim 13, wherein said hole means includes a plurality of holes.

16. A terminal lug as defined in claim 13, wherein said hole means includes at least one round hole.

17. A terminal lug as defined in claim 13, wherein said hole means includes at least one polygonal hole.

18. A terminal lug as defined in claim 13, wherein said hole means includes a pair of spaced holes one at each opposite end of the raised portion.

References Cited

UNITED STATES PATENTS

| 2,369,380 | 2/1945 | Tinnerman | 85—36 X |
| 2,713,386 | 7/1955 | Holtz | 155—196 |
| 2,783,674 | 3/1957 | Becker | 85—36 |
| 2,965,812 | 12/1960 | Bedford | 317—101 |
| 3,275,736 | 9/1966 | Hotine et al. | 339—17 X |
| 3,355,687 | 11/1967 | Adams | 339—220 X |

FOREIGN PATENTS 793,871   4/1958   Great Britain.

RICHARD E. MOORE, Primary Examiner

U.S. Cl. X.R.

85—36; 339—220